(12) United States Patent
Dahms et al.

(10) Patent No.: US 7,958,300 B2
(45) Date of Patent: Jun. 7, 2011

(54) DATA STORAGE METHODS AND SYSTEMS FOR USE ON A MOBILE DEVICE

(75) Inventors: John F. A. Dahms, Waterloo (CA); Anthony F. Scian, Waterloo (CA); Michael J. Carmody, Waterloo (CA)

(73) Assignee: Research In Motion Limited, Waterloo (CA)

( * ) Notice: Subject to any disclaimer, the term of this patent is extended or adjusted under 35 U.S.C. 154(b) by 216 days.

(21) Appl. No.: 11/249,599

(22) Filed: Oct. 13, 2005

(65) Prior Publication Data
US 2007/0087783 A1   Apr. 19, 2007

(51) Int. Cl.
*G06F 12/00*   (2006.01)
(52) U.S. Cl. .......... 711/103; 711/202; 711/E12.008
(58) Field of Classification Search .......... 711/103, 711/202, E12.008
See application file for complete search history.

(56) References Cited

U.S. PATENT DOCUMENTS

| | | | |
|---|---|---|---|
| 5,832,493 A | | 11/1998 | Marshall et al. |
| 6,038,636 A | * | 3/2000 | Brown et al. ........... 711/103 |
| 6,412,080 B1 | | 6/2002 | Fleming et al. |
| 6,839,823 B1 | | 1/2005 | See et al. |
| 7,174,416 B2 | * | 2/2007 | Hasbun et al. ........... 711/103 |
| 2002/0036492 A1 | * | 3/2002 | Slater et al. ........... 324/142 |
| 2006/0004950 A1 | * | 1/2006 | Wang et al. ........... 711/103 |
| 2006/0143365 A1 | * | 6/2006 | Kikuchi ........... 711/103 |
| 2006/0253484 A1 | * | 11/2006 | Bangalore et al. ........... 707/102 |

OTHER PUBLICATIONS

European Search Report of Application No. 05022398.1, date of mailing Jun. 2, 2006—8 pgs.
Article 94(3) EPC Communication, issued Mar. 26, 2008, for European Application No. 05022398.1.

* cited by examiner

*Primary Examiner* — Shane M Thomas
(74) *Attorney, Agent, or Firm* — Jones Day; Krishna K. Pathiyal; Robert C. Liang

(57) ABSTRACT

Systems and methods for operating upon a mobile communications device. A system and method can be used with data operations with respect to the mobile communications device's memory, wherein the memory has sectors. Data structures are used with the data operations to determine whether a sector contains valid data or to locate a record's pointer in the memory. The data structures can be used for such operations as record creation, record movement, recovery, etc.

36 Claims, 12 Drawing Sheets

DATA STORAGE METHODS AND SYSTEMS FOR USE ON A MOBILE DEVICE

BACKGROUND

1. Technical Field

This disclosure relates generally to mobile device operations, and in particular, to handling data storage operations involving a mobile device.

2. Description of the Related Art

Mobile devices (e.g., personal digital assistants (PDAs), cellular phones, mobile messaging devices, etc.) frequently perform data storage operations in order to store data used on a mobile device. The data to be stored can be information from many different types of sources, such as from the user of the mobile device, software applications operating on or externally to the mobile device. Difficulties can arise in attempting to handle data storage operations in an efficient and robust manner. The difficulties are enhanced on a resource constrained device, such as a mobile device, where a traditional file system may be deemed as being too "heavyweight" for such a device.

DETAILED DESCRIPTION

Figure 1:
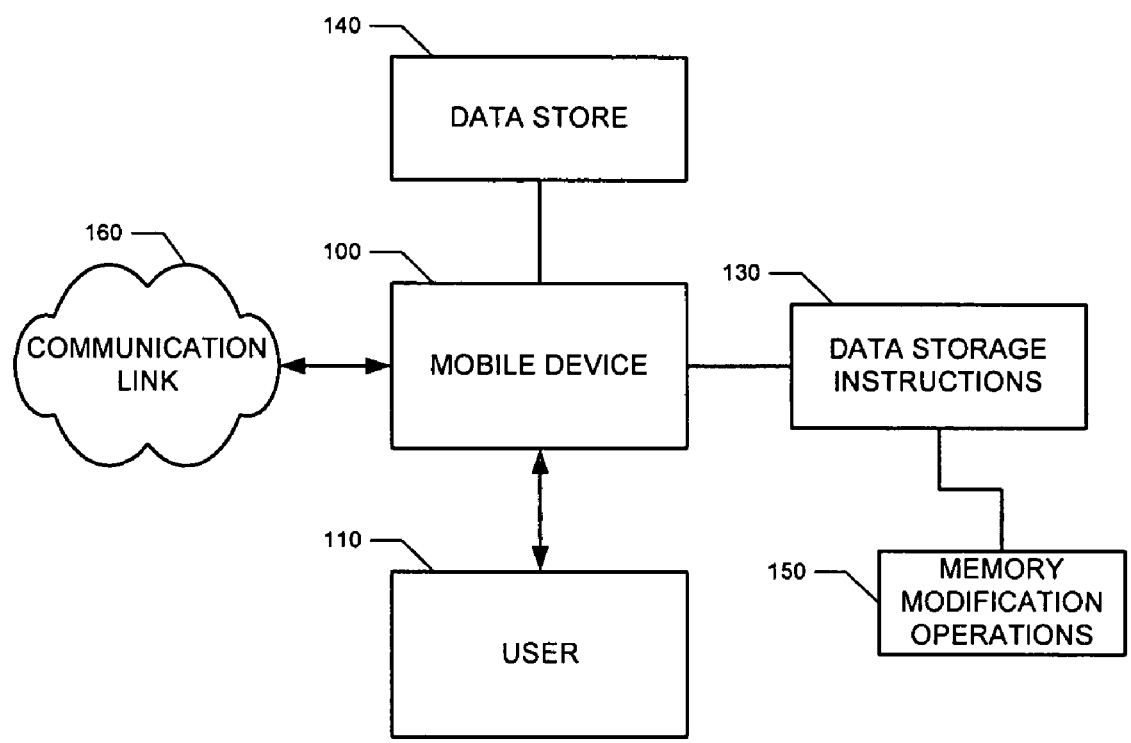
FIG. 1 is a block diagram depicting a mobile device configured to handle data storage operations.

FIG. 1 depicts a mobile communications device 100 that is configured to store data generated from one or more sources in a data store 140. The sources can include a user 110 of the mobile device 100, software applications operating on the mobile device 100 or software applications operating externally from the mobile device 100, such as over a communication link 160 (e.g., a physical communication link, wireless communication networks, etc.).

The mobile device 100 includes data storage instructions 130 for handling data storage operations with respect to the data store 140, such as memory modification operations 150. Memory modification operations 150 performed by the data storage instructions 130 can be used by the mobile device 100 when data is created or modified in some manner with respect to the data store 140. Such operations can include data record creations, deletions, movements, etc. For example, in a mobile device address-book application, a user may add new contact data that needs to be stored in the data store 140. The memory modification operations 150 handle the writing of the new contact data to the data store 140.

Figure 2:
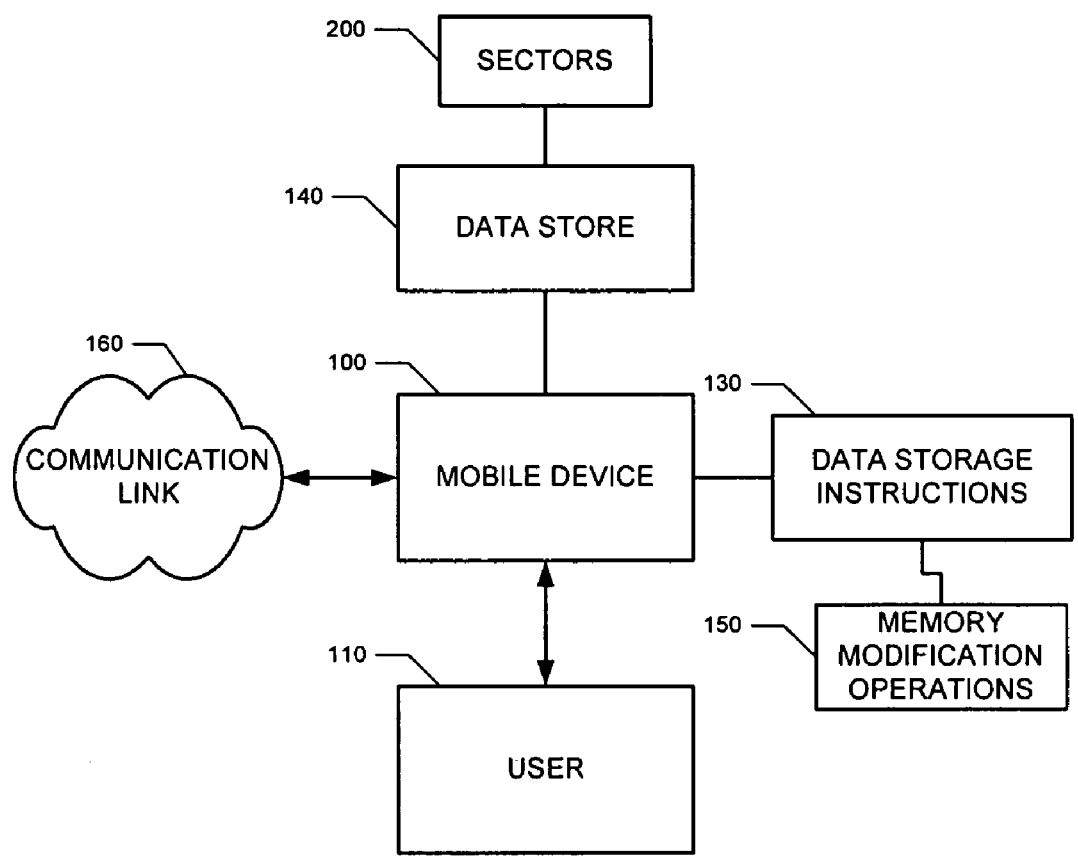
FIG. 2 is a block diagram illustrating a mobile device whose data store is divided into sectors.

FIG. 2 illustrates a mobile device whose data store 140 contains sectors 200. Example of sector sizes are typically between 64K and 256K in size (but growing every year). An example of a data store that is divided into sectors is NOR flash memory. Flash memory (sometimes called "flash RAM") is a type of constantly-powered non-volatile memory that can be erased and reprogrammed in units of memory. NOR flash has a full address/data (memory) interface that allows random access to any location.

When a sector (also known as an "erase block") of NOR flash is "erased," its bits are all set to 1. Bits in NOR flash can only be changed from a 0-bit to a 1-bit by "erasing" a sector. This changes all of the bits in the sector from 0 to 1. Writes in NOR flash are typically performed as a bit-wise AND operation. Write granularity ranges between one bit, and one byte. A write operation can only change a 1-bit to a 0-bit. Bytes in flash which have never been modified from their "erased" state (0xFF) are collectively called "clean space".

Figure 3:
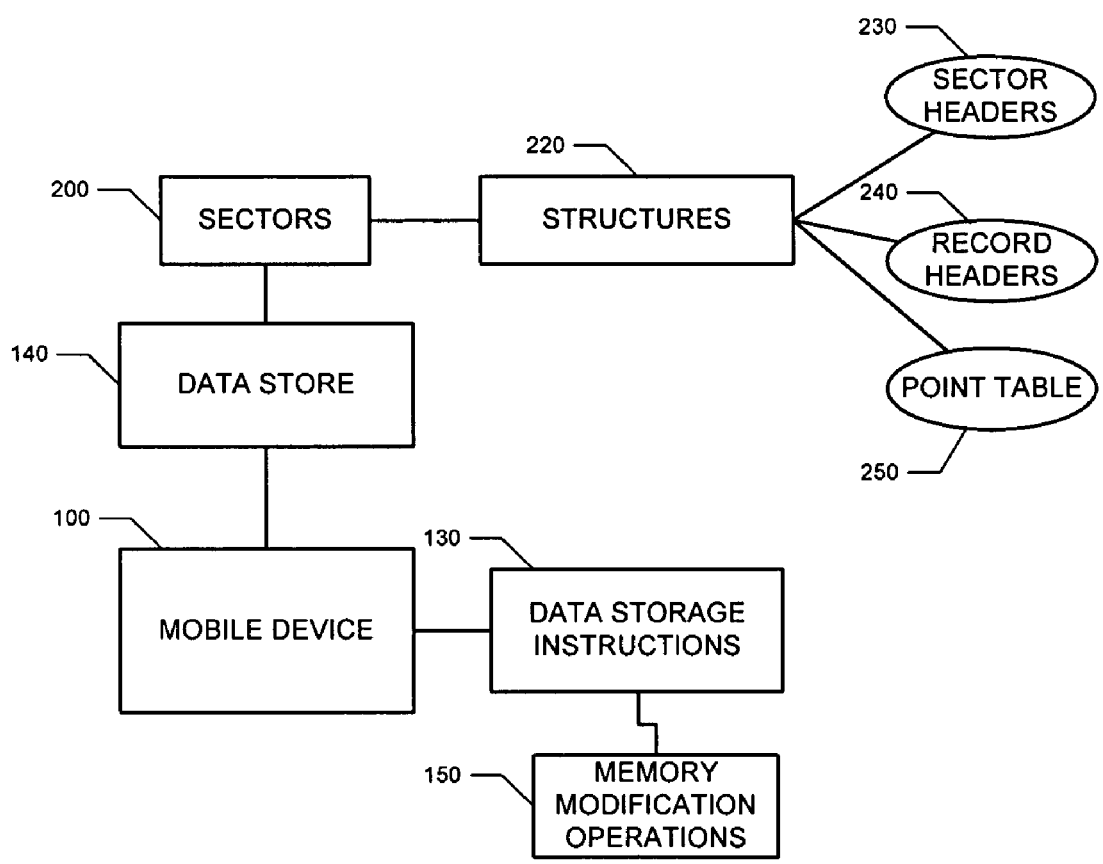
FIG. 3 is a block diagram illustrating sectors containing structures for use in memory modification operations.

FIG. 3 illustrates sectors 200 of a data store 140 having structures 220 for use in memory modification operations 150. Structures 220 can include sector headers 230, record headers 240, and a point table 250. A sector header which appears at the beginning of a sector can contain the following:

int signature;
    int version;

The signature field can be used to determine whether a sector contains valid data. For example, a sector can be deemed to contain valid data if and only if the signature is a certain number (e.g., 0xDA7ABA5E).

A record header follows a sector header and can contain the following:

byte valid;
    byte freed;
    int recordSize;
    int recordHandle;
    byte data[ . . . ];

Each record has a unique integer handle. A record is referenced by its handle. The flags "valid and freed" are considered "true" if their value is 0, otherwise they are considered false.

A point table is a data structure that maps record handles to flash addresses. This allows a record to be moved in flash, but maintain the same handle.

Figure 4:
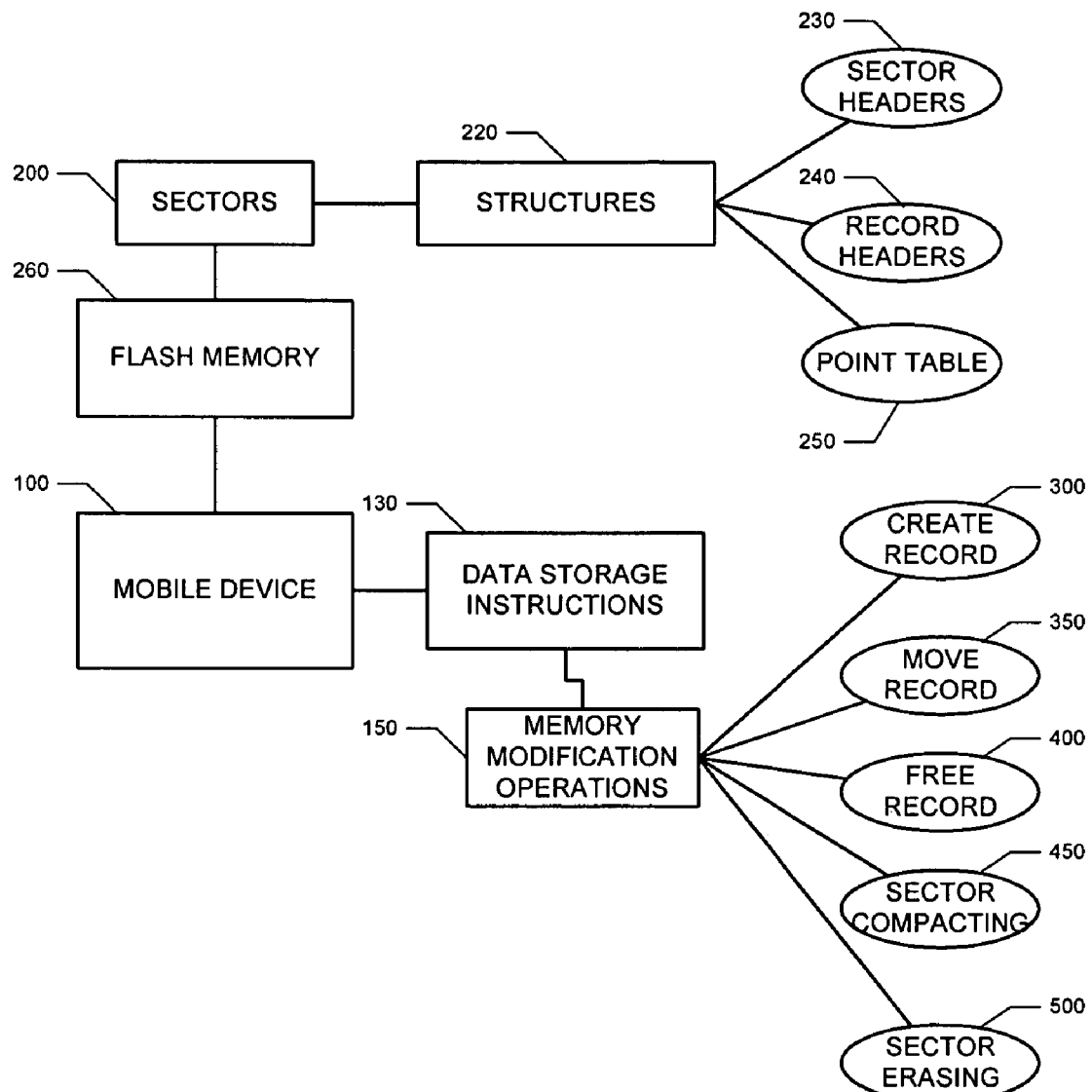
FIG. 4 is a block diagram illustrating different types of memory modification operations.

FIG. 4 illustrates in a non-limiting manner-how memory modification operations 150 can include many different types of memory modification operations, such as record creation 300, record movement 350, freeing records 400, sector compacting 450, and sector erasing 500. These non-limiting examples of memory modification operations 150 are discussed in the flowcharts of FIGS. 5-9.

Figure 5:
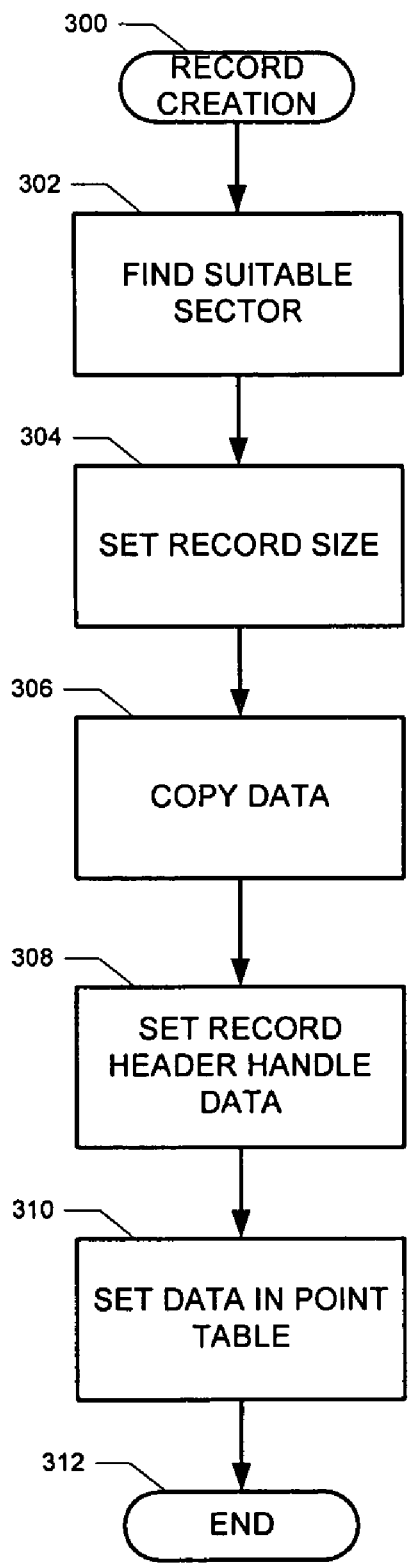
FIG. 5 is a flowchart depicting an operational scenario that involves a record creation operation.

FIG. 5 depicts an operational scenario 300 that involves a record creation operation. With reference to FIG. 5, a suitable sector is located at step 302 for the record that is to be created. This can be done by finding a sector that has enough clean space for the new record. New records can be created after the end of the last valid record in the sector, in the clean space.

At step 304, the record size is set in the record header structure, such as by setting the RecordHeader.recordSize equal to the size of the record to be created. At step 306, the data is copied into the record header structure, such as by copying data into RecordHeader.data[ ]. At step 308, the handle of the record header structure is set, such as by setting RecordHeader.handle equal to nextHandle( ). The valid flag of the record header structure is then set at step 310, such as by setting RecordHeader.valid equal to 0. The point table is updated to reflect this new mapping of the record handle to flash address, such as by associating PointTable[handle] to the RecordHeader. This scenario ends at end block 312.

Figure 6:
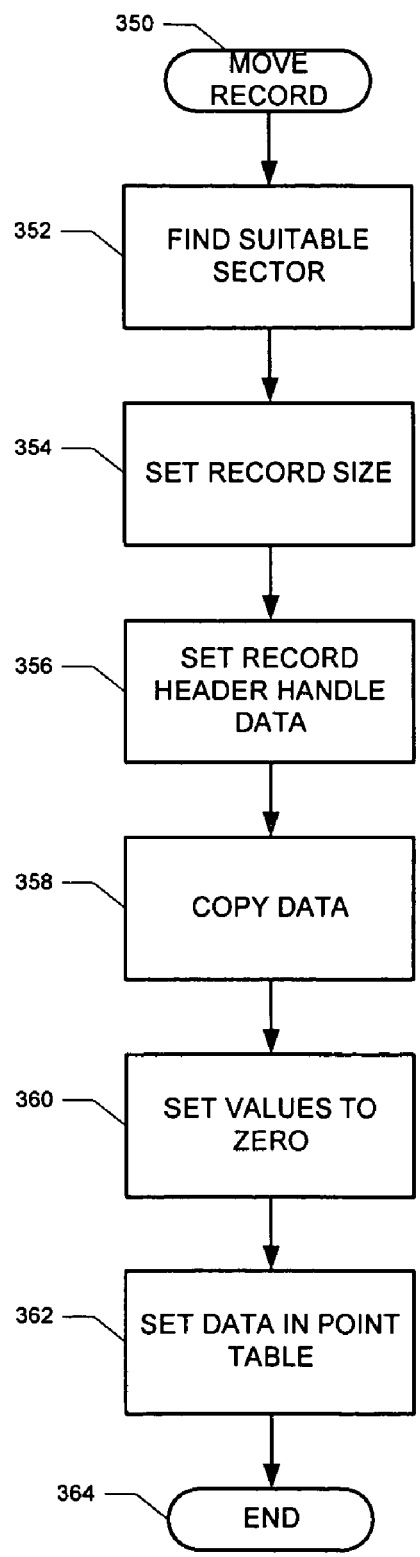
FIG. 6 is a flowchart depicting an operational scenario that involves moving a record to a new sector.

FIG. 6 depicts an operational scenario 350 that involves moving a record to a new sector. With reference to FIG. 6, a suitable sector is located at step 352. This can be done by finding a sector with enough clean space for a copy of the record. At step 354, the record size in the new record header structure is set, such as by setting the NewRecordHeader.recordSize to the OldRecordHeader.recordSize. At step 356, the handle of the new record header is set, such as by setting the NewRecordHeader.recordHandle to OldRecordHeader.recordHandle.

At step 358, data is copied from the old record header structure to the new record header structure, such as by copying data from OldRecordHeader.data[ ] to NewRecordHeader.data[ ]. At step 360, the NewRecordHeader.valid is set to 0, and the OldRecordHeader.freed is set to 0. The point table is updated at step 362 to reflect this new mapping of the record handle to flash address, such as by associating PointTable[handle] to the NewRecordHeader. This scenario ends at end block 364.

Figure 7:
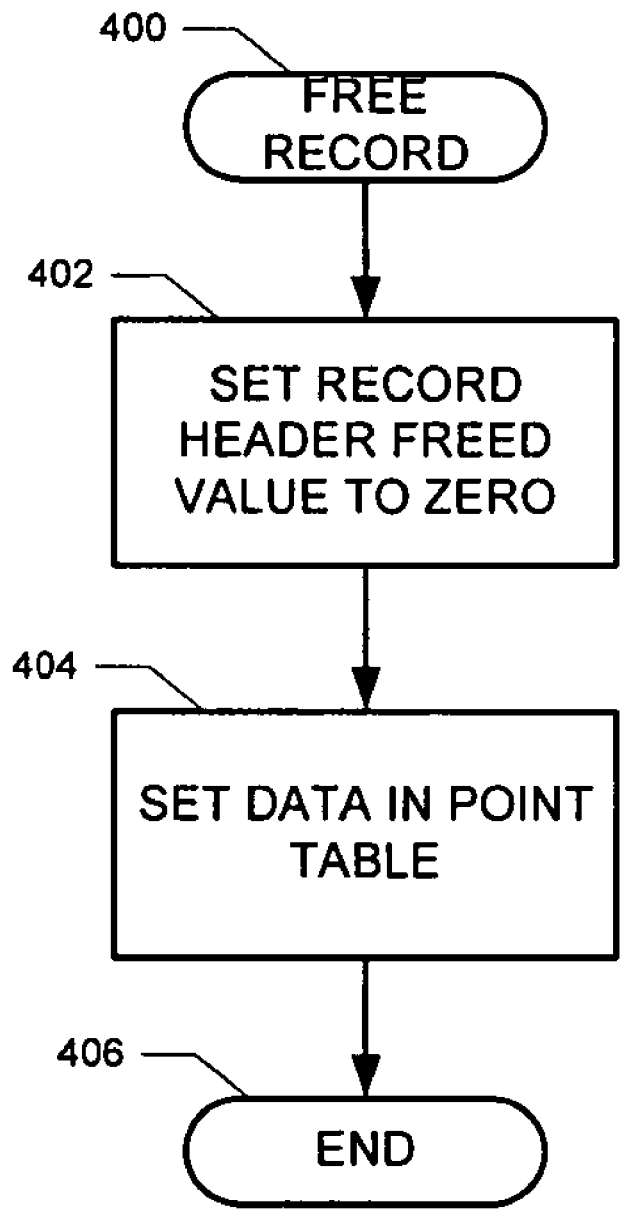
FIG. 7 is a flowchart depicting an operational scenario that involves freeing a record.

FIG. 7 depicts an operational scenario 400 that involves freeing a record. With reference to FIG. 7, the record header freed value is set to zero at step 402, such by setting RecordHeader.freed to 0. At step 404, the point table is updated to reflect this new mapping of the record handle to flash address, such as by associating PointTable[handle] to NULL (e.g., a value that can be used to distinguish a freed record pointer from any valid record pointer, commonly a pointer equal to zero). Reclaiming this space can be done through a sector compact operation (which is discussed in the flowchart of FIG. 8). This scenario ends at end block 406.

Figure 8:
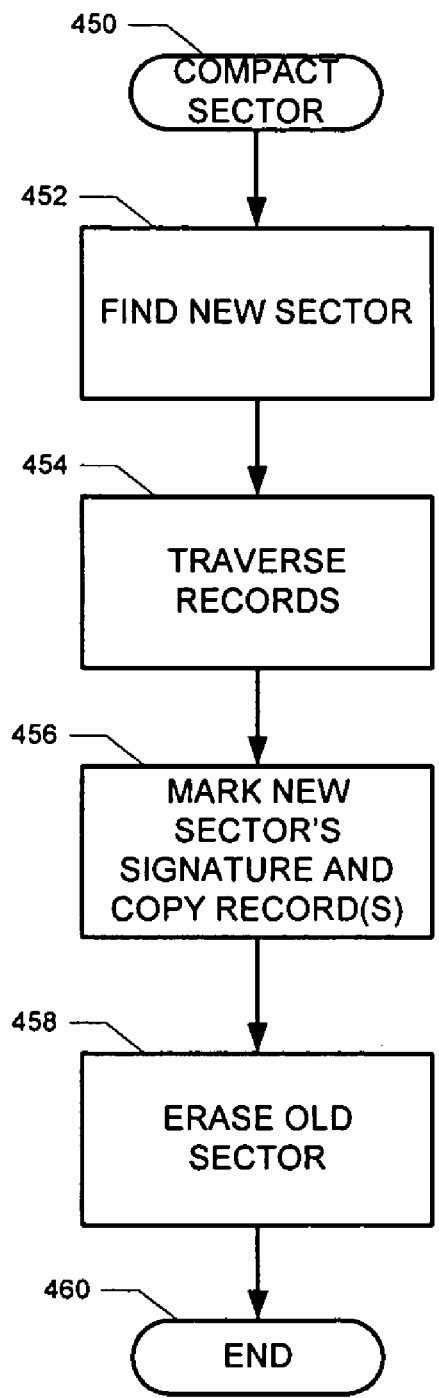
FIG. 8 is a flowchart depicting an operational scenario that involves compacting a sector.

FIG. 8 depicts an operational scenario 450 that involves compacting a sector. With reference to FIG. 8, a new (e.g., entirely full of clean space) sector is located at step 452. At step 454, the records in the sector are traversed until encountering a RecordHeader with valid!=0. At step 456, the new sector's signature is marked as valid and the records are copied from the old sector to the new sector. At step 458, the old sector is erased. This scenario ends at end block 460.

Figure 9:
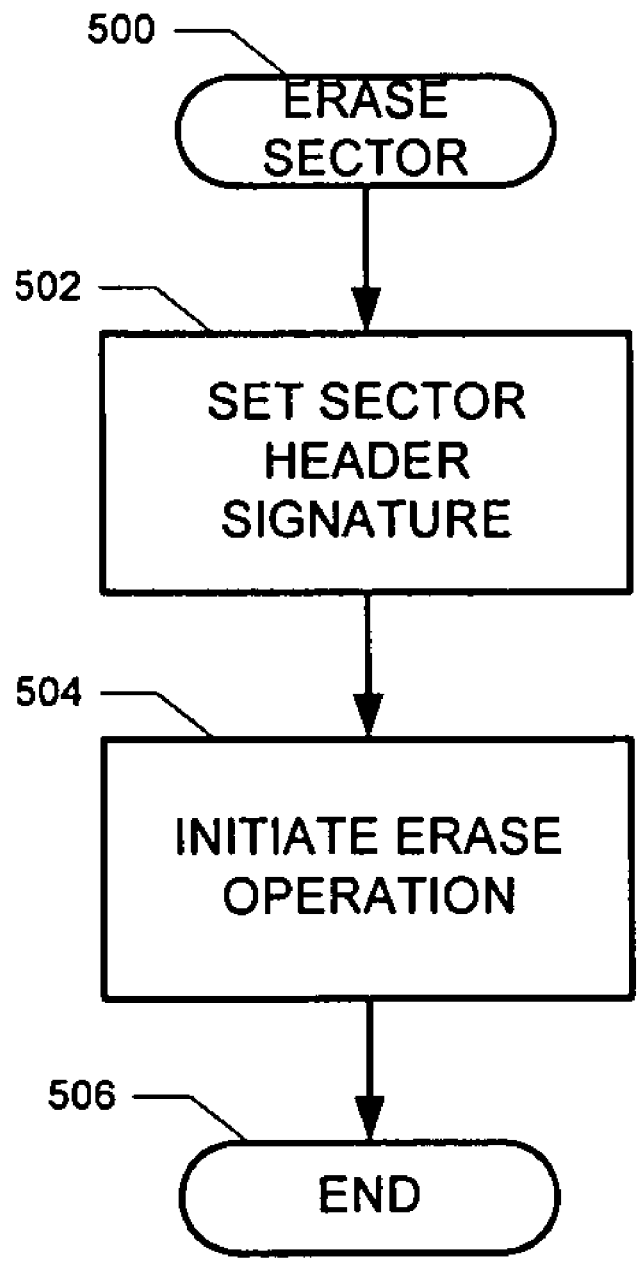
FIG. 9 is a flowchart depicting an operational scenario that involves erasing a sector.

FIG. 9 depicts an operational scenario 500 that involves erasing a sector (e.g., resetting the entire sector to clean space). With reference to FIG. 9, the sector header signature value is set to an invalid value, such as by setting SectorHeader.signature to 0. At step 504, a sector erase operation is initiated that changes all sector 0's to 1's thus creating an entire sector of clean space.

Figure 10:
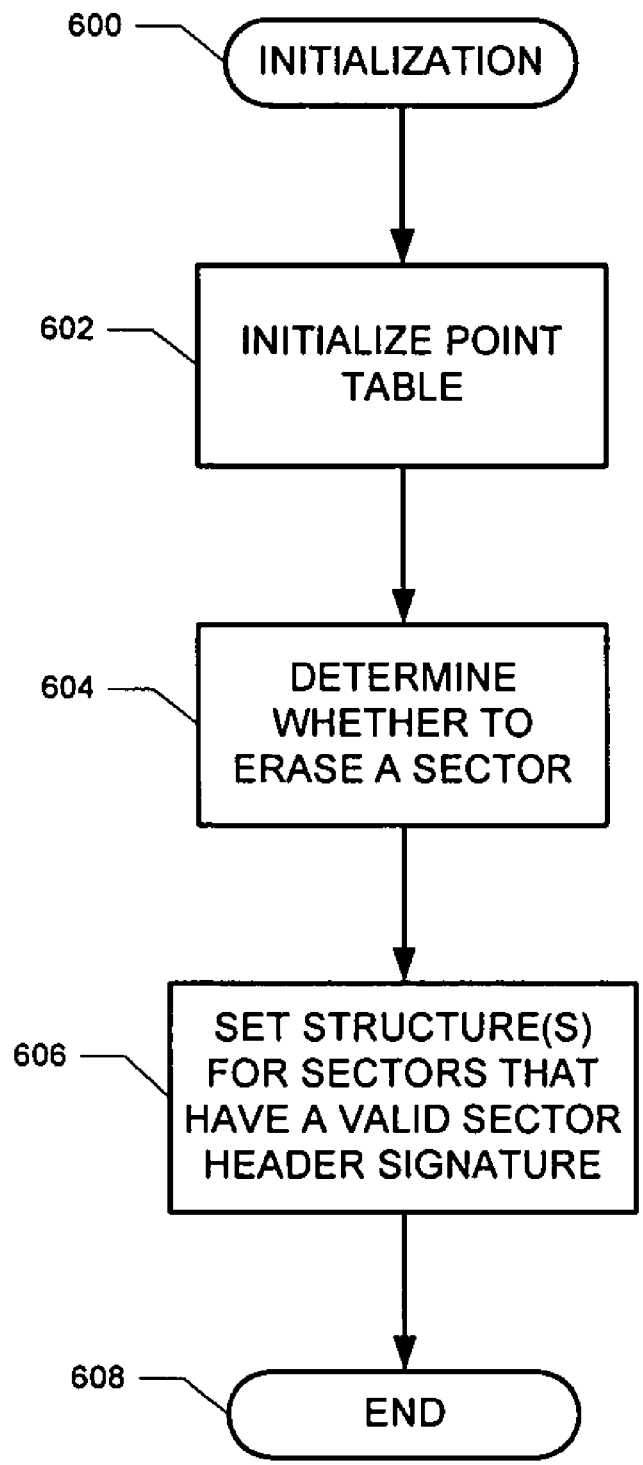
FIG. 10 is a flowchart depicting an initialization operational scenario.

FIG. 10 is a flowchart depicting an initialization (e.g., recovery) operational scenario 600. With reference to FIG. 10, the point table is initialized at step 602. The point table can be initialized, such as setting PointTable[handle] to NULL for all handles.

At step 604, there is a determination as to whether to erase a sector. This can be accomplished as follows. For any sector that has an invalid SectorHeader.signature, such sectors are erased. This can be used to handle the case where an erase operation was initiated, but the erase did not finish.

For each sector with a valid SectorHeader.signature, the RecordHeaders are traversed in that sector until encountering the first record where RecordHeader.valid !=0. For each such RecordHeader found, if PointTable[RecordHeader.handle]= NULL, then set PointTable[RecordHeader.handle] equal to RecordHeader; else set RecordHeader.freed to 0. This can be used to handle the case where a record was being copied from one location to another when a reset has occurred.

For each sector that has a valid SectorHeader.signature, the RecordHeaders in that sector are traversed until encountering the first record where RecordHeader.valid !=0. For each RecordHeader found, if the field valid=0xFF, and another field !=0xFF, then this sector is compacted and the loop is exited. This cleans up any damage done when a record failed to be created properly.

These recovery steps as illustrated in FIG. 10 allow the data store to recover to a consistent state. For example, the data store recovers in a consistent state despite power failing part way through recovery because the recovery process itself uses the primitive operations described above (e.g., creating a record, moving a record, etc. as shown in FIG. 4) when it modifies flash.

The systems and methods disclosed herein are presented only by way of example and are not meant to limit the scope of the invention. Other variations of the systems and methods described above will be apparent to those skilled in the art and as such are considered to be within the scope of the invention.

As an example of the wide scope of the approaches described herein, a system and method can be configured for operating upon a mobile communications device. The system and method can be for use with data operations with respect to the mobile communications device's memory, wherein the memory has sectors. Data structures are used with the data operations to determine whether a sector contains valid data or to locate a record's pointer in the memory.

As another example, a system and method can be configured with sector header data structures for the sectors. The sector header data structures are configured to store sector header signature data, wherein the sector header signature data is for use in determining whether a sector contains valid data. Record header data structures can also be provided for the sectors. The record header data structures are configured to store record size data and a unique record handle for identifying a record. A point data store can store a mapping between the record handles and addresses of the memory. When a data operation for a record is performed with respect to the memory, the mapping from the point data store and data from at least one record header data structure can be used in locating the record's pointer in the memory and performing the data operation.

As yet another example of the wide scope of the approaches described herein, a system and method can be configured as disclosed herein for use in data storage operations that are frequently being performed to store data on a mobile device. Such a system and method can store binary data records in flash memory in a robust and transactional manner. As an illustration, if power fails (e.g., a battery is removed) when the record is being written, the record can be recovered or discarded on startup. Also such a system and method can be used with limited overhead space, which is useful for a resource constrained device such as a mobile device.

As another example, a system and method can be configured as disclosed herein so as to achieve relocation of pointers to flash by tagging every record in the filesystem. When a record is moved, the tag allows the Java virtual machine that is operating on the mobile device to locate the correct pointer to the record and update it. This is an inverse of the scheme of searching for pointers to the relocated record.

Figure 11:
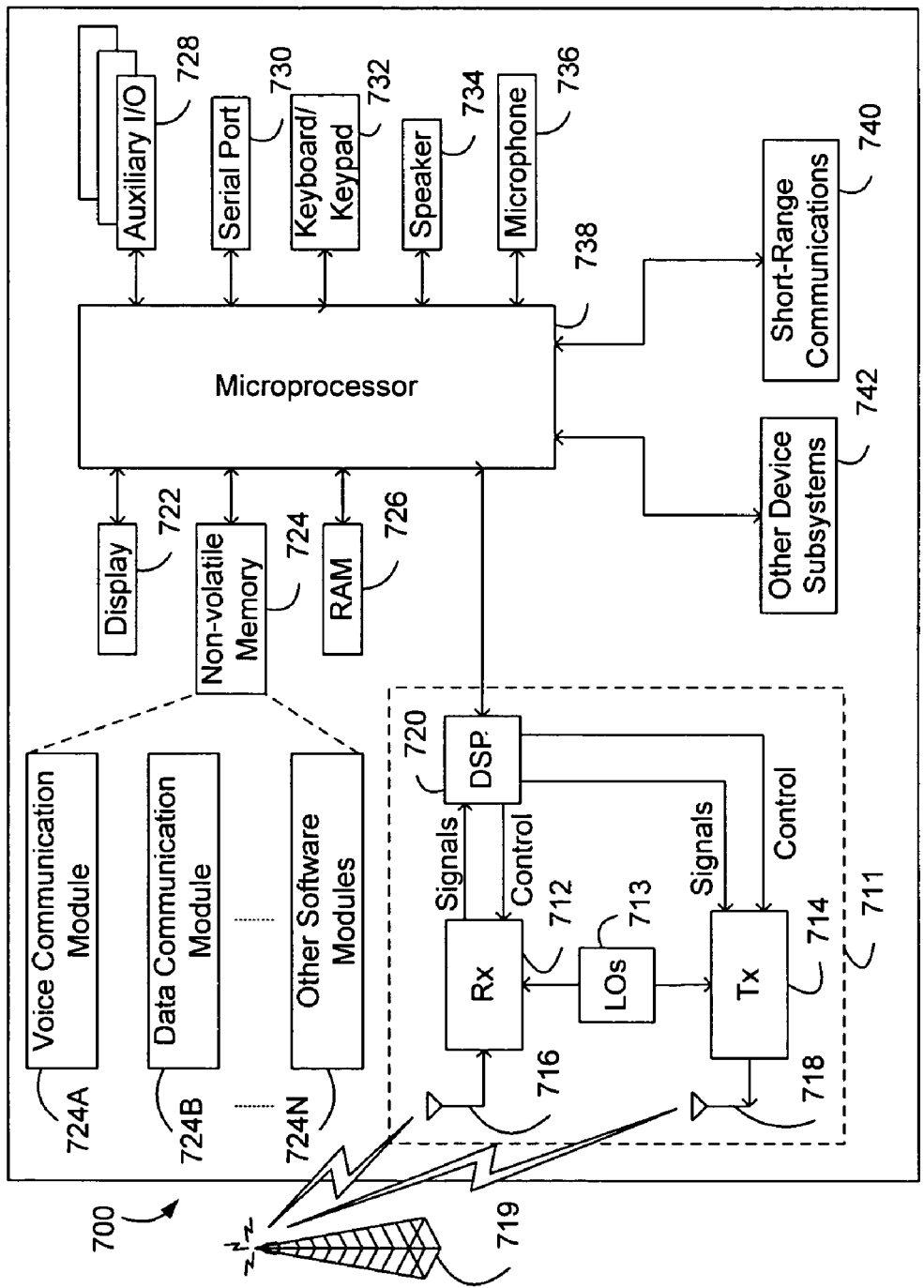
FIG. 11 is a block diagram of an example mobile device.

As yet another example, the systems and methods disclosed herein may be used with many different types of computers and devices, such as a wireless mobile communications device shown in FIG. 11. With reference to FIG. 11, the mobile device 700 is a dual-mode mobile device and includes a transceiver 711, a microprocessor 738, a display 722, non-volatile memory 724, random access memory (RAM) 726, one or more auxiliary input/output (I/O) devices 728, a serial port 730, a keyboard/keypad 732, a speaker 734, a microphone 736, a short-range wireless communications sub-system 740, and other device sub-systems 742.

The transceiver 711 includes a receiver 712, a transmitter 714, antennas 716 and 718, one or more local oscillators 713, and a digital signal processor (DSP) 720. The antennas 716 and 718 may be antenna elements of a multiple-element antenna, and are preferably embedded antennas. However, the systems and methods described herein are in no way restricted to a particular type of antenna, or even to wireless communication devices.

The mobile device 700 is preferably a two-way communication device having voice and data communication capabilities. Thus, for example, the mobile device 700 may communicate over a voice network, such as any of the analog or digital cellular networks, and may also communicate over a data network. The voice and data networks are depicted in FIG. 11 by the communication tower 719. These voice and data networks may be separate communication networks using separate infrastructure, such as base stations, network controllers, etc., or they may be integrated into a single wireless network.

The transceiver 711 is used to communicate with the network 719, and includes the receiver 712, the transmitter 714, the one or more local oscillators 713 and the DSP 720. The DSP 720 is used to send and receive signals to and from the transceivers 716 and 718, and also provides control information to the receiver 712 and the transmitter 714. If the voice and data communications occur at a single frequency, or closely-spaced sets of frequencies, then a single local oscillator 713 may be used in conjunction with the receiver 712 and the transmitter 714. Alternatively, if different frequencies are utilized for voice communications versus data communications for example, then a plurality of local oscillators 713 can be used to generate a plurality of frequencies corresponding to the voice and data networks 719. Information, which includes both voice and data information, is communicated to and from the transceiver 711 via a link between the DSP 720 and the microprocessor 738.

The detailed design of the transceiver 711, such as frequency band, component selection, power level, etc., will be dependent upon the communication network 719 in which the mobile device 700 is intended to operate. For example, a mobile device 100 intended to operate in a North American market may include a transceiver 711 designed to operate with any of a variety of voice communication networks, such as the Mobitex or DataTAC mobile data communication networks, AMPS, TDMA, CDMA, PCS, etc., whereas a mobile device 100 intended for use in Europe may be configured to operate with the GPRS data communication network and the GSM voice communication network. Other types of data and voice networks, both separate and integrated, may also be utilized with a mobile device 100.

Depending upon the type of network or networks 719, the access requirements for the mobile device 700 may also vary. For example, in the Mobitex and DataTAC data networks, mobile devices are registered on the network using a unique identification number associated with each mobile device. In GPRS data networks, however, network access is associated with a subscriber or user of a mobile device. A GPRS device typically requires a subscriber identity module ("SIM"), which is required in order to operate a mobile device on a GPRS network.

After any required network registration or activation procedures have been completed, the mobile device 700 may the send and receive communication signals, including both voice and data signals, over the networks 719. Signals received by the antenna 716 from the communication network 719 are routed to the receiver 712, which provides for signal amplification, frequency down conversion, filtering, channel selection, etc., and may also provide analog to digital conversion. Analog to digital conversion of the received signal allows more complex communication functions, such as digital demodulation and decoding to be performed using the DSP 720. In a similar manner, signals to be transmitted to the network 719 are processed, including modulation and encoding, for example, by the DSP 720 and are then provided to the transmitter 714 for digital to analog conversion, frequency up conversion, filtering, amplification and transmission to the communication network 719 via the antenna 718.

In addition to processing the communication signals, the DSP 720 also provides for transceiver control. For example, the gain levels applied to communication signals in the receiver 712 and the transmitter 714 may be adaptively controlled through automatic gain control algorithms implemented in the DSP 720. Other transceiver control algorithms could also be implemented in the DSP 720 in order to provide more sophisticated control of the transceiver 711.

The microprocessor 738 preferably manages and controls the overall operation of the mobile device 700. Many types of microprocessors or microcontrollers could be used here, or, alternatively, a single DSP 720 could be used to carry out the functions of the microprocessor 738. Low-level communication functions, including at least data and voice communications, are performed through the DSP 720 in the transceiver 711. Other, high-level communication applications, such as a voice communication application 724A, and a data communication application 724B may be stored in the non-volatile memory 724 for execution by the microprocessor 738. For example, the voice communication module 724A may provide a high-level user interface operable to transmit and receive voice calls between the mobile device 700 and a plurality of other voice or dual-mode devices via the network 719. Similarly, the data communication module 724B may provide a high-level user interface operable for sending and receiving data, such as e-mail messages, files, organizer information, short text messages, etc., between the mobile device 700 and a plurality of other data devices via the networks 719.

The microprocessor 738 also interacts with other device subsystems, such as the display 722, the RAM 726, the auxiliary input/output (I/O) subsystems 728, the serial port 730, the keyboard/keypad 732, the speaker 734, the microphone 736, the short-range communications subsystem 740 and any other device subsystems generally designated as 742.

Some of the subsystems shown in FIG. 11 perform communication-related functions, whereas other subsystems may provide "resident" or on-device functions. Notably, some subsystems, such as the keyboard/keypad 732 and the display 722 may be used for both communication-related functions, such as entering a text message for transmission over a data communication network, and device-resident functions such as a calculator or task list or other PDA type functions.

Operating system software used by the microprocessor 738 is preferably stored in a persistent store such as non-volatile memory 724. The non-volatile memory 724 may be implemented, for example, as a Flash memory component, or as battery backed-up RAM. In addition to the operating system, which controls low-level functions of the mobile device 710, the non-volatile memory 724 includes a plurality of software modules 724A-724N that can be executed by the microprocessor 738 (and/or the DSP 720), including a voice communication module 724A, a data communication module 724B, and a plurality of other operational modules 724N for carrying out a plurality of other functions. These modules are executed by the microprocessor 738 and provide a high-level interface between a user and the mobile device 700. This interface typically includes a graphical component provided through the display 722, and an input/output component provided through the auxiliary I/O 728, keyboard/keypad 732, speaker 734, and microphone 736. The operating system, specific device applications or modules, or parts thereof, may be temporarily loaded into a volatile store, such as RAM 726 for faster operation. Moreover, received communication signals may also be temporarily stored to RAM 726, before permanently writing them to a file system located in a persistent store such as the Flash memory 724.

An exemplary application module 724N that may be loaded onto the mobile device 700 is a personal information manager (PIM) application providing PDA functionality, such as calendar events, appointments, and task items. This module 724N may also interact with the voice communication module 724A for managing phone calls, voice mails, etc., and may also interact with the data communication module for managing e-mail communications and other data transmissions. Alternatively, all of the functionality of the voice communication module 724A and the data communication module 724B may be integrated into the PIM module.

The non-volatile memory 724 preferably also provides a file system to facilitate storage of PIM data items on the device. The PIM application preferably includes the ability to send and receive data items, either by itself, or in conjunction with the voice and data communication modules 724A, 724B, via the wireless networks 719. The PIM data items are preferably seamlessly integrated, synchronized and updated, via the wireless networks 719, with a corresponding set of data items stored or associated with a host computer system, thereby creating a mirrored system for data items associated with a particular user.

Context objects representing at least partially decoded data items, as well as fully decoded data items, are preferably stored on the mobile device 700 in a volatile and non-persistent store such as the RAM 726. Such information may instead be stored in the non-volatile memory 724, for example, when storage intervals are relatively short, such that the information is removed from memory soon after it is stored. However, storage of this information in the RAM 726 or another volatile and non-persistent store is preferred, in order to ensure that the information is erased from memory when the mobile device 700 loses power. This prevents an unauthorized party from obtaining any stored decoded or partially decoded information by removing a memory chip from the mobile device 700, for example.

The mobile device 700 may be manually synchronized with a host system by placing the device 100 in an interface cradle, which couples the serial port 730 of the mobile device 700 to the serial port of a computer system or device. The serial port 730 may also be used to enable a user to set preferences through an external device or software application, or to download other application modules 724N for installation. This wired download path may be used to load an encryption key onto the device, which is a more secure method than exchanging encryption information via the wireless network 719. Interfaces for other wired download paths may be provided in the mobile device 700, in addition to or instead of the serial port 730. For example, a USB port would provide an interface to a similarly equipped personal computer.

Additional application modules 724N may be loaded onto the mobile device 700 through the networks 719, through an auxiliary I/O subsystem 728, through the serial port 730, through the short-range communications subsystem 740, or through any other suitable subsystem 742, and installed by a user in the non-volatile memory 724 or RAM 726. Such flexibility in application installation increases the functionality of the mobile device 700 and may provide enhanced on-device functions, communication-related functions, or both. For example, secure communication applications may enable electronic commerce functions and other such financial transactions to be performed using the mobile device 700.

When the mobile device 700 is operating in a data communication mode, a received signal, such as a text message or a web page download, is processed by the transceiver module 711 and provided to the microprocessor 738, which preferably further processes the received signal in multiple stages as described above, for eventual output to the display 722, or, alternatively, to an auxiliary I/O device 728. A user of mobile device 100 may also compose data items, such as e-mail messages, using the keyboard/keypad 732, which is preferably a complete alphanumeric keyboard/keypad laid out in the QWERTY style, although other styles of complete alphanumeric keyboards/keypads such as the known DVORAK style may also be used. User input to the mobile device 700 is further enhanced with a plurality of auxiliary I/O devices 728, which may include a thumbwheel input device, a touchpad, a variety of switches, a rocker input switch, etc. The composed data items input by the user may then be transmitted over the communication networks 719 via the transceiver module 711.

When the mobile device 700 is operating in a voice communication mode, the overall operation of the mobile device is substantially similar to the data mode, except that received signals are preferably be output to the speaker 734 and voice signals for transmission are generated by a microphone 736. Alternative voice or audio I/O subsystems, such as a voice message recording subsystem, may also be implemented on the mobile device 700. Although voice or audio signal output is preferably accomplished primarily through the speaker 734, the display 722 may also be used to provide an indication of the identity of a calling party, the duration of a voice call, or other voice call related information. For example, the microprocessor 738, in conjunction with the voice communication module and the operating system software, may detect the caller identification information of an incoming voice call and display it on the display 722.

A short-range communications subsystem 740 is also included in the mobile device 700. The subsystem 740 may include an infrared device and associated circuits and components, or a short-range RF communication module such as a Bluetooth™ module or an 802.11 module, for example, to provide for communication with similarly-enabled systems and devices. It should be appreciated that "Bluetooth" and "802.11" refer to sets of specifications, available from the Institute of Electrical and Electronics Engineers, relating to wireless personal area networks and wireless local area networks, respectively.

Figure 12:
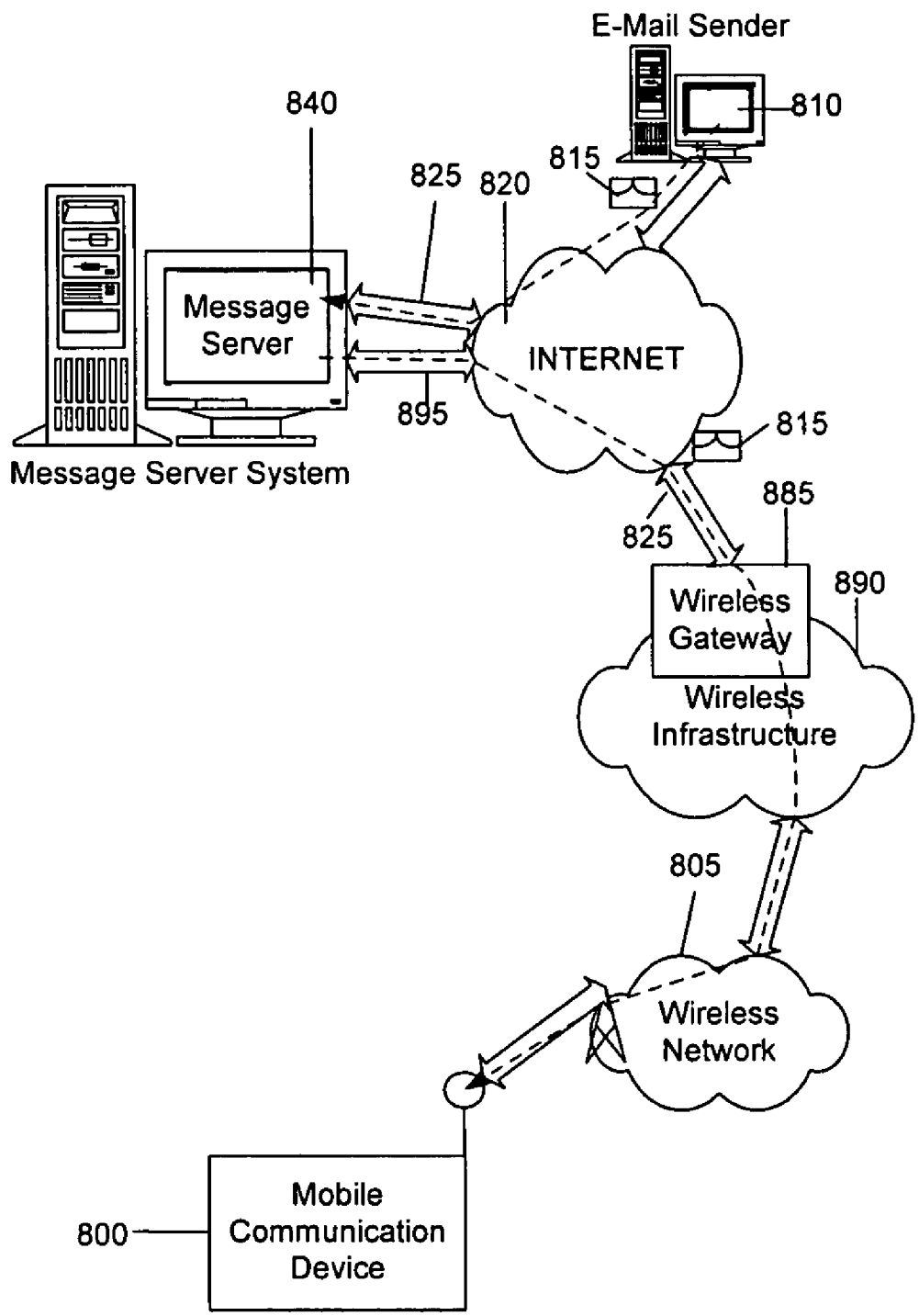
FIG. 12 is an overview of an example communication system in which a mobile device may be used.

FIG. 12 is an overview of an example communication system in which a mobile device may be used. One skilled in the art will appreciate that there may be hundreds of different topologies, but the system shown in FIG. 12 helps demonstrate the operation of the encoded message processing systems and methods described in the present application. There may also be many message senders and recipients. The simple system shown in FIG. 12 is for illustrative purposes only, and shows perhaps the most prevalent Internet e-mail environment where security is not generally used.

FIG. 12 shows an e-mail sender 810, the Internet 820, a message server system 840, a wireless gateway 885, wireless infrastructure 890, a wireless network 805 and a mobile communication device 800.

An e-mail sender system 810 may, for example, be connected to an ISP (Internet Service Provider) on which a user of the system 810 has an account, located within a company, possibly connected to a local area network (LAN), and connected to the Internet 820, or connected to the Internet 820 through a large ASP (application service provider) such as America Online (AOL). Those skilled in the art will appreciate that the systems shown in FIG. 12 may instead be connected to a wide area network (WAN) other than the Internet, although e-mail transfers are commonly accomplished through Internet-connected arrangements as shown in FIG. 12.

The message server 840 may be implemented, for example, on a network computer within the firewall of a corporation, a computer within an ISP or ASP system or the like, and acts as the main interface for e-mail exchange over the Internet 820. Although other messaging systems might not require a message server system 840, a mobile device 800 configured for receiving and possibly sending e-mail will normally be associated with an account on a message server. Perhaps the two most common message servers are Microsoft Exchange™ and Lotus Domino™. These products are often used in conjunction with Internet mail routers that route and deliver mail. These intermediate components are not shown in FIG. 12, as they do not directly play a role in the secure message processing described below. Message servers such as server 840 typically extend beyond just e-mail sending and receiving; they also include dynamic database storage engines that have predefined database formats for data like calendars, to-do lists, task lists, e-mail and documentation.

The wireless gateway 885 and infrastructure 890 provide a link between the Internet 820 and wireless network 805. The wireless infrastructure 90 determines the most likely network for locating a given user and tracks the user as they roam between countries or networks. A message is then delivered to the mobile device 800 via wireless transmission, typically at a radio frequency (RF), from a base station in the wireless network 805 to the mobile device 800. The particular network 805 may be virtually any wireless network over which messages may be exchanged with a mobile communication device.

As shown in FIG. 12, a composed e-mail message 815 is sent by the e-mail sender 810, located somewhere on the Internet 820. This message 815 is normally fully in the clear and uses traditional Simple Mail Transfer Protocol (SMTP), RFC822 headers and Multipurpose Internet Mail Extension (MIME) body parts to define the format of the mail message. These techniques are all well known to those skilled in the art. The message 815 arrives at the message server 840 and is normally stored in a message store. Most known messaging systems support a so-called "pull" message access scheme, wherein the mobile device 800 must request that stored messages be forwarded by the message server to the mobile device 800. Some systems provide for automatic routing of such messages which are addressed using a specific e-mail address associated with the mobile device 800. In a preferred embodiment described in further detail below, messages addressed to a message server account associated with a host system such as a home computer or office computer which belongs to the user of a mobile device 800 are redirected from the message server 840 to the mobile device 800 as they are received.

Regardless of the specific mechanism controlling the forwarding of messages to the mobile device 800, the message 815, or possibly a translated or reformatted version thereof, is sent to the wireless gateway 885. The wireless infrastructure 890 includes a series of connections to wireless network 805. These connections could be Integrated Services Digital Network (ISDN), Frame Relay or T1 connections using the TCP/IP protocol used throughout the Internet. As used herein, the term "wireless network" is intended to include three different types of networks, those being (1) data-centric wireless networks, (2) voice-centric wireless networks and (3) dual-mode networks that can support both voice and data communications over the same physical base stations. Combined dual-mode networks include, but are not limited to, (1) Code Division Multiple Access (CDMA) networks, (2) the Groupe Special Mobile or the Global System for Mobile Communications (GSM) and the General Packet Radio Service (GPRS) networks, and (3) future third-generation (3G) networks like Enhanced Data-rates for Global Evolution (EDGE) and Universal Mobile Telecommunications Systems (UMTS). Some older examples of data-centric network include the Mobitex™ Radio Network and the DataTAC™ Radio Network. Examples of older voice-centric data networks include Personal Communication Systems (PCS) networks like GSM, and TDMA systems.

The systems and methods may be provided on many different types of computer-readable media including computer storage mechanisms (e.g., CD-ROM, diskette, RAM, flash memory, computer's hard drive, etc.) that contain instructions for use in execution by a processor to perform the methods' operations and implement the systems described herein.

The computer components, software modules, functions and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

To further illustrate the broad scope of the disclosed systems and methods, the following is provided. Program code is usually interpreted by software. However, a code processor can be implemented in hardware. Adaptation of the disclosed systems and methods to a hardware processor is within the scope of the invention.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

It is claimed:

1. A system for operating upon a mobile communications device for use with data operations with respect to a mobile communications device's memory, wherein the memory has sectors, the system comprising:

sector header data structures contained in the sectors;
wherein the sector header data structures are configured to store sector header signature data, wherein the sector header signature data is for use in determining whether a sector contains valid data, wherein a valid sector header signature value is a multi-bit value known to the mobile communications device, wherein a sector is considered to contain valid data where the sector header data structures contain a valid sector header signature value;
record header data structures contained in the sectors;
wherein each record header data structure is configured to store data of a record, size data of the record, a unique record handle for identifying the record, and a valid field that stores information that is indicative of whether a record is valid;
a point table configured to store a mapping between the record handles and addresses of the memory at which the record header data structures storing the data of the records are stored;
wherein the point table is updated upon initialization of the mobile communications device based upon whether the valid field of a record header data structure is set to true and whether the data stored in the point table for a record is null;
wherein when a data operation for a record is performed with respect to the memory, the data of the record in the memory are located directly from the mapping from the point table and data from at least one record header data structure and the data operation on the data of the record is performed thereon.

2. The system of claim 1, wherein the mobile communications device is a wireless mobile communications device, a personal digital assistant (PDA), cellular phone, or mobile messaging device.

3. The system of claim 1, wherein the record was generated from interaction with the mobile device's user, or software applications operating on or externally to the mobile device.

4. The system of claim 1, wherein the memory is a flash memory device that has an address/data interface to allow random access to a memory location.

5. The system of claim 1, wherein the use of the point table allows a record to be moved in the memory while maintaining the same unique record handle.

6. The system of claim 5, wherein when a record is moved, the data in the point table allows the mobile device to locate a pointer to the record.

7. The system of claim 1, wherein the sector header data structures include version data associated with the sectors.

8. The system of claim 1, wherein a sector header data structure is located at a sector's beginning.

9. The system of claim 8, wherein a record header data structure is located subsequent to a sector header data structure.

10. The system of claim 1, wherein each record header data structure further includes a freed field, a record size field, and a record data field;
wherein the freed field stores information that is indicative of whether a record has been freed with respect to the memory;
wherein the record size field stores information that is indicative of the size of the record;
wherein the record data field stores the data of the record.

11. The system of claim 10, wherein for creating a record, a sector is located for the new record;
wherein a new record is created after the end of the last valid record in the located sector;
wherein record size is set in the record header structure such that it is equal to the size of the record to be created;
wherein the record's data is copied into the record data field;
wherein the valid field of the record header structure is set to true;
wherein the point table is updated to indicate the mapping of the record handle to the record's memory address.

12. The system of claim 10, wherein for moving a record, a sector is located for moving the record;
wherein the record size and record handle is set in the new record header structure such that they are respectively equal to the record size and record handle set in the old record header structure;
wherein the record's data is copied into the new record data field;
wherein the valid field of the new record header structure is set to true;
wherein the old record header freed field is set to true;
wherein the point table is updated to indicate the mapping of the record handle to the record's memory address.

13. The system of claim 10, wherein for freeing a record, the freed field of the record header structure is set to true;
wherein the point table is updated to indicate the mapping of the record handle to a null value.

14. The system of claim 10, wherein for compacting a sector containing records into a clean sector, the valid records in the sector to be compacted are traversed and copied to the clean sector, whereupon the signature data associated with the new sector is marked as valid, and the old sector is erased.

15. The system of claim 10, wherein for erasing a sector, the signature data associated with the signature is set to an invalid value and an erase operation is initiated with respect to the sector.

16. The system of claim 10, wherein upon initialization of the mobile device, for a sector that has an invalid sector header signature data, the sector is erased;
and
wherein the point table resides in non-volatile memory.

17. The system of claim 1, wherein the use of the sector header data structures, record header data structures and the point table in recovery operations allow the memory to recover to a consistent state.

18. The system of claim 17, wherein recovery to a consistent state is achieved despite power failing during a memory modification operation.

19. The system of claim 1, wherein a record comprises a binary data record.

20. The system of claim 1, wherein a sector is deemed to contain valid data if and only if the sector header signature data contains a certain number known to the mobile communications device.

21. A method for use with data operations with respect to a mobile communications device's memory, wherein the memory has sectors, the method comprising:
providing sector header data structures for the sectors;
wherein the sector header data structures are configured to store sector header signature data, wherein the sector header signature data is for use in determining whether a sector contains valid data, wherein a valid sector header signature value is a multi-bit value known to the mobile communications device, wherein a sector is considered to contain valid data where the sector header data structures contain a valid sector header signature value;
providing record header data structures for the sectors;
wherein each record header data structure is configured to store data of a record, size data of the record, a unique record handle for identifying the record, and a valid field that stores information that is indicative of whether a record is valid;

providing a point table that is configured to store a mapping between the record handles and addresses of the memory at which the record header data structures storing the data of the records are stored;

wherein the point table is updated upon initialization of the mobile communications device based upon whether the valid field of a record header data structure is set to true and whether the data stored in the point table for a record is null;

wherein when a data operation for a record is performed with respect to the memory, the data of the record in the memory are located directly from the mapping from the point table and data from at least one record header data structure and the data operation on the data of the record is performed thereon.

22. The method of claim 21, wherein each record header data structure further includes a freed field, a record size field, and a record data field;

wherein the freed field stores information that is indicative of whether a record has been freed with respect to the memory;

wherein the record size field stores information that is indicative of the size of the record;

wherein the record data field stores the data of the record.

23. The method of claim 22, further comprising creating a record which comprises:
locating a sector;
creating a new record after the end of the last valid record in the located sector;
setting record size in the record header structure such that it is equal to the size of the record to be created;
copying the record's data into the record data field;
setting the valid field of the record header structure to true; and
updating the point table to indicate the mapping of the record handle to the record's memory address.

24. The method of claim 22, further comprising moving a record which comprises:
locating a sector;
setting record size and record handle in a new record header structure such that they are respectively equal to the record size and record handle set in the old record header structure;
copying the old record's data into the new record data field;
setting the valid field of the new record header structure to true;
setting the old record header freed field to true; and
updating the point table to indicate the mapping of the record handle to the new record's memory address.

25. The method of claim 22, further comprising freeing a record which comprises:
setting the freed field of the record header structure to true; and
updating the point table to indicate the mapping of the record handle to a null value.

26. The method of claim 22, further comprising compacting a sector containing records into a clean sector which comprises:
traversing and copying the valid records in the sector to be compacted to the clean sector;
marking the signature data associated with the new sector as valid; and
erasing the old sector.

27. The method of claim 22, further comprising erasing a sector which comprises:
setting the signature data associated with the signature to an invalid value; and
initiating an erase operation with respect to the sector.

28. The method of claim 22, further comprising:
erasing a sector that has an invalid sector header signature data upon initialization of the mobile communications device; and
wherein the point table resides in non-volatile memory.

29. A mobile communications device containing a processor for performing data operations, comprising:
a data store having sectors, wherein sector header data structures are contained in the sectors;
wherein the sector header data structures are configured to store sector header signature data, wherein the sector header signature data is for use in determining whether a sector contains valid data, wherein a valid sector header signature value is a multi-bit value known to the mobile communications device, wherein a sector is considered to contain valid data where the sector header data structures contain a valid sector header signature value;
record header data structures contained in the sectors;
wherein each record header data structure is configured to store data of a record, size data of the record, a unique record handle for identifying the record, and a valid field that stores information that is indicative of whether a record is valid;
a point table configured to store a mapping between the record handles and addresses of the data store at which the record header data structures storing the data of the records are stored;
wherein the point table is updated upon initialization of the mobile communications device based upon whether the valid field of a record header data structure is set to true and whether the data stored in the point table for a record is null;
wherein when a data operation for a record is performed with respect to the memory, the data of the record in the memory are located directly from the mapping from the point table and data from at least one record header data structure and the data operation on the data of the record is performed thereon.

30. The device of claim 29, wherein each record header data structure further includes a freed field, a record size field, and a record data field;
wherein the freed field stores information that is indicative of whether a record has been freed with respect to the memory;
wherein the record size field stores information that is indicative of the size of the record;
wherein the record data field stores the data of the record.

31. The device of claim 30, wherein for creating a record, a sector is located for the new record;
wherein a new record is created after the end of the last valid record in the located sector;
wherein record size is set in the record header structure such that it is equal to the size of the record to be created;
wherein the record's data is copied into the record data field;
wherein the valid field of the record header structure is set to true;
wherein the point table is updated to indicate the mapping of the record handle to the record's memory address.

32. The device of claim 30, wherein for moving a record, a sector is located for moving the record;

wherein the record size and record handle is set in the new record header structure such that they are respectively equal to the record size and record handle set in the old record header structure;

wherein the record's data is copied into the new record data field;

wherein the valid field of the new record header structure is set to true;

wherein the old record header freed field is set to true;

wherein the point table is updated to indicate the mapping of the record handle to the record's memory address.

33. The device of claim 30, wherein for freeing a record, the freed field of the record header structure is set to true;

wherein the point table is updated to indicate the mapping of the record handle to a null value.

34. The device of claim 30, wherein for compacting a sector containing records into a clean sector, the valid records in the sector to be compacted are traversed and copied to the clean sector, whereupon the signature data associated with the new sector is marked as valid, and the old sector is erased.

35. The device of claim 30, wherein for erasing a sector, the signature data associated with the signature is set to an invalid value and an erase operation is initiated with respect to the sector.

36. The device of claim 30, wherein upon initialization of the mobile device, for a sector that has an invalid sector header signature data, the sector is erased;

and wherein the point table resides in non-volatile memory.

* * * * *